April 9, 1935.   H. H. BARBER   1,997,037
ROAD LOADER AND MIXING MACHINE
Filed Oct. 3, 1932   8 Sheets-Sheet 1
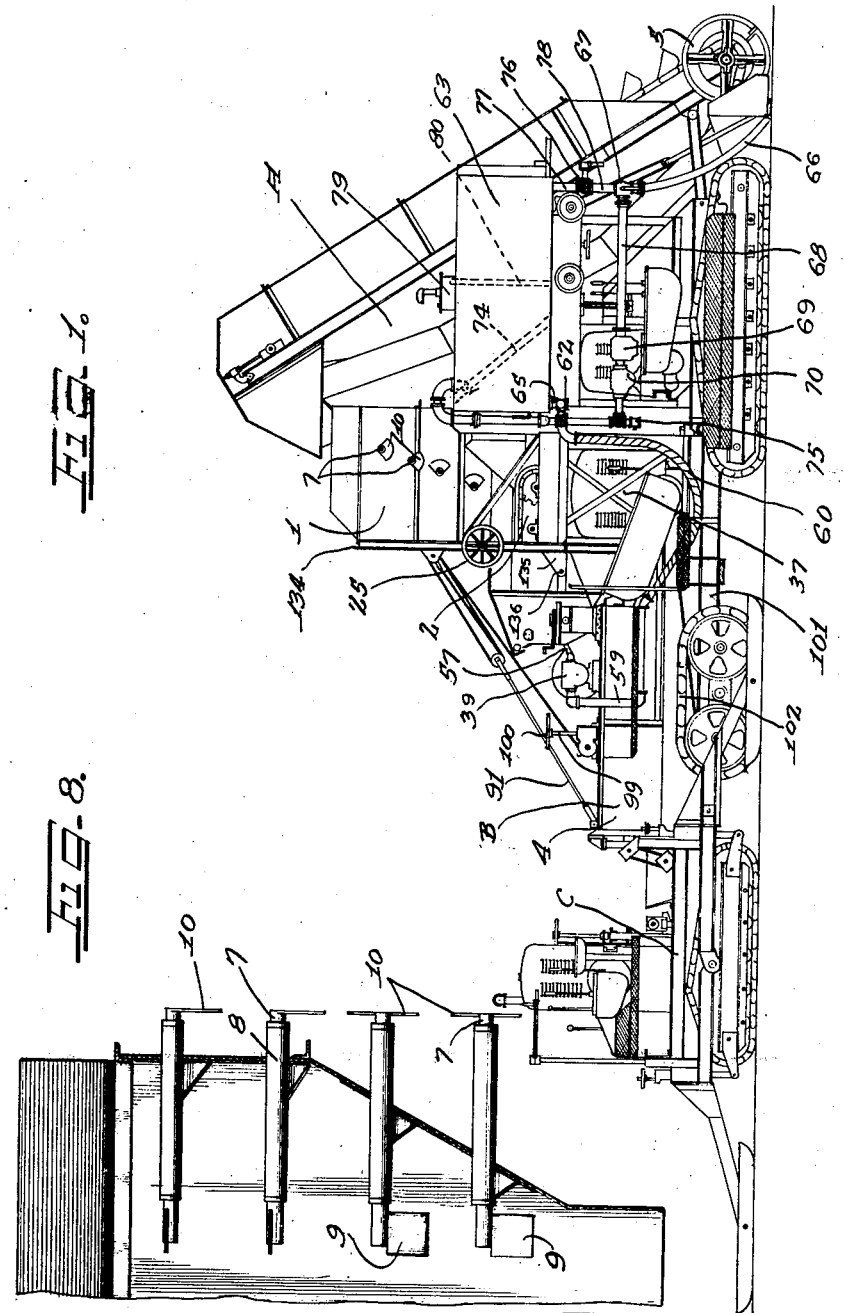
Inventor
Harry H. Barber
by Charles M. Hills
Attys.

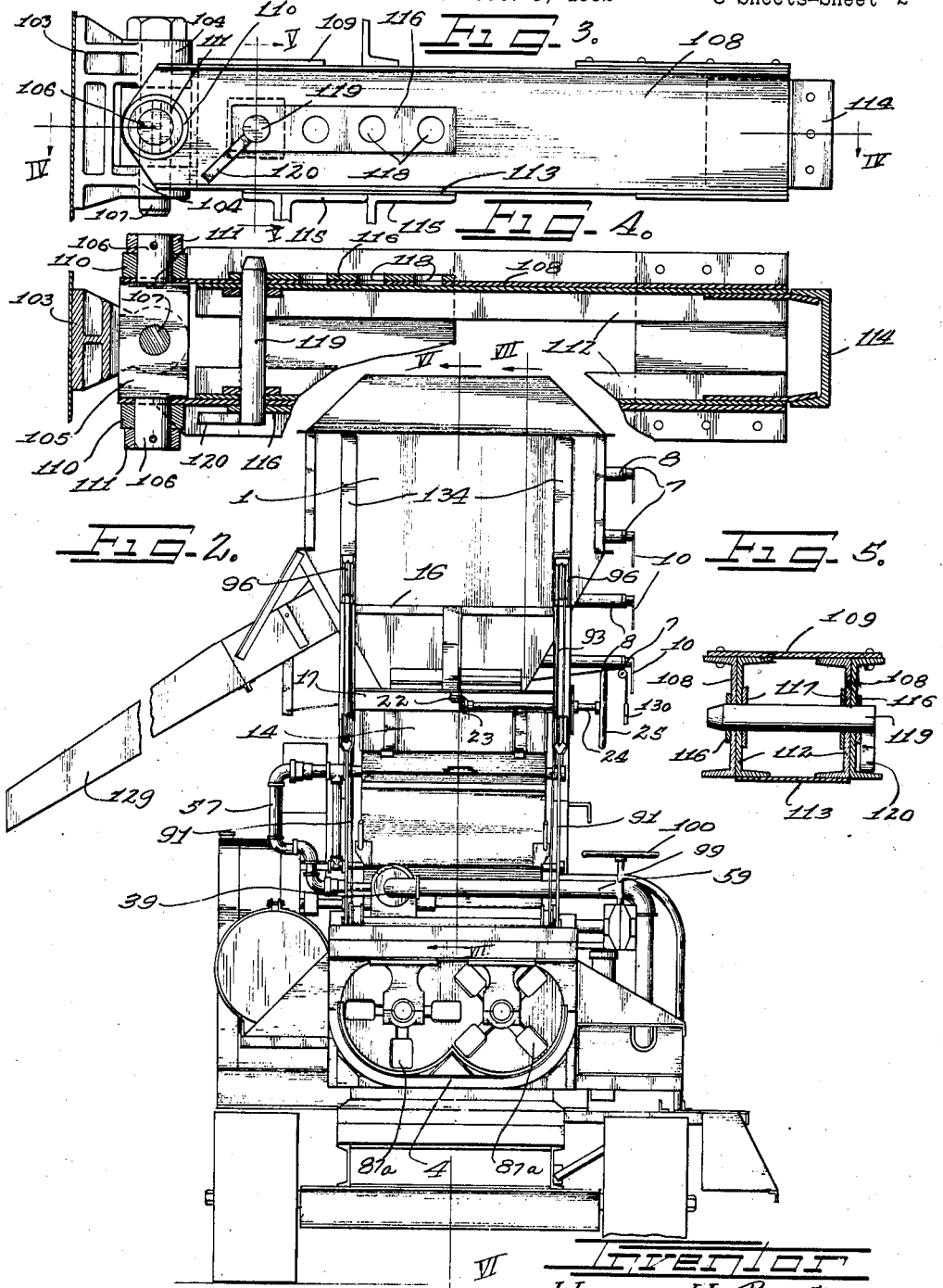

April 9, 1935.  H. H. BARBER  1,997,037
ROAD LOADER AND MIXING MACHINE
Filed Oct. 3, 1932　　8 Sheets-Sheet 3

Inventor
Harry H. Barber.
By Charles W. Hills Attys.

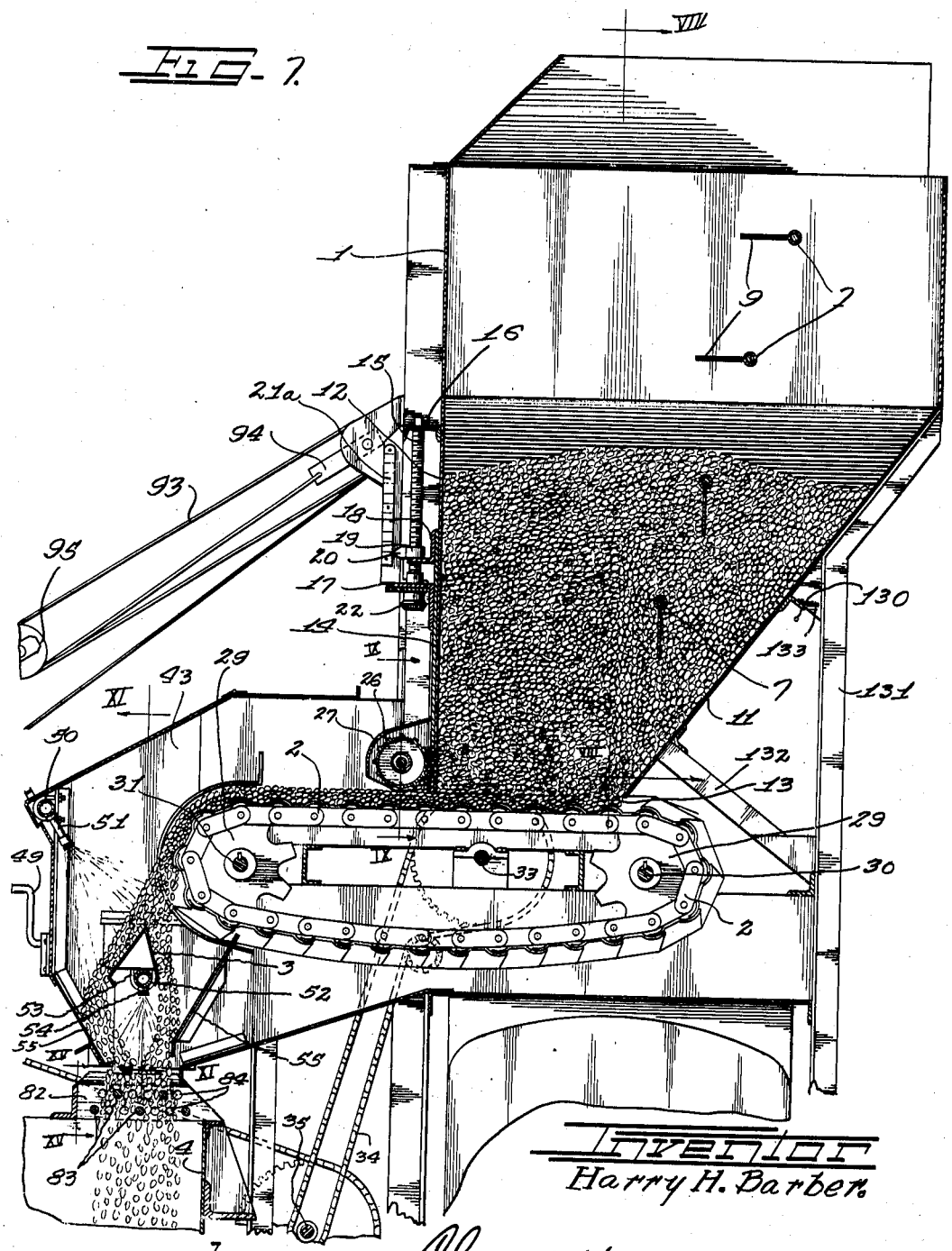

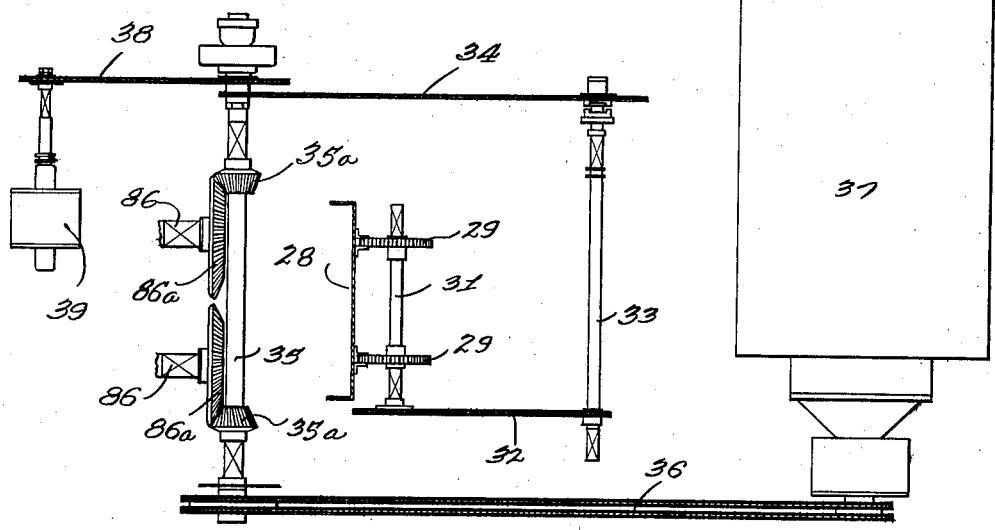
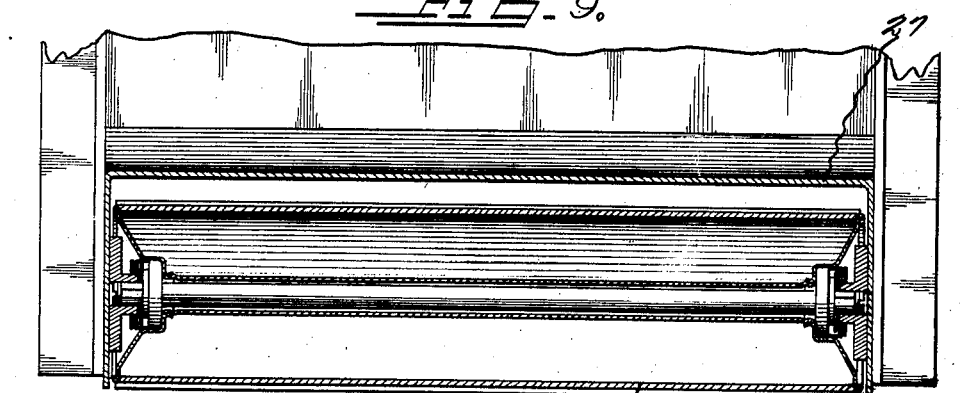
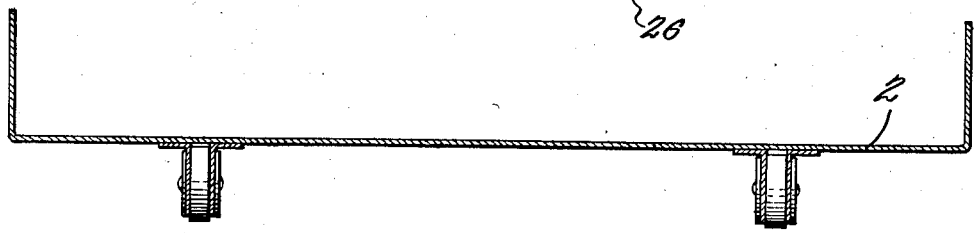

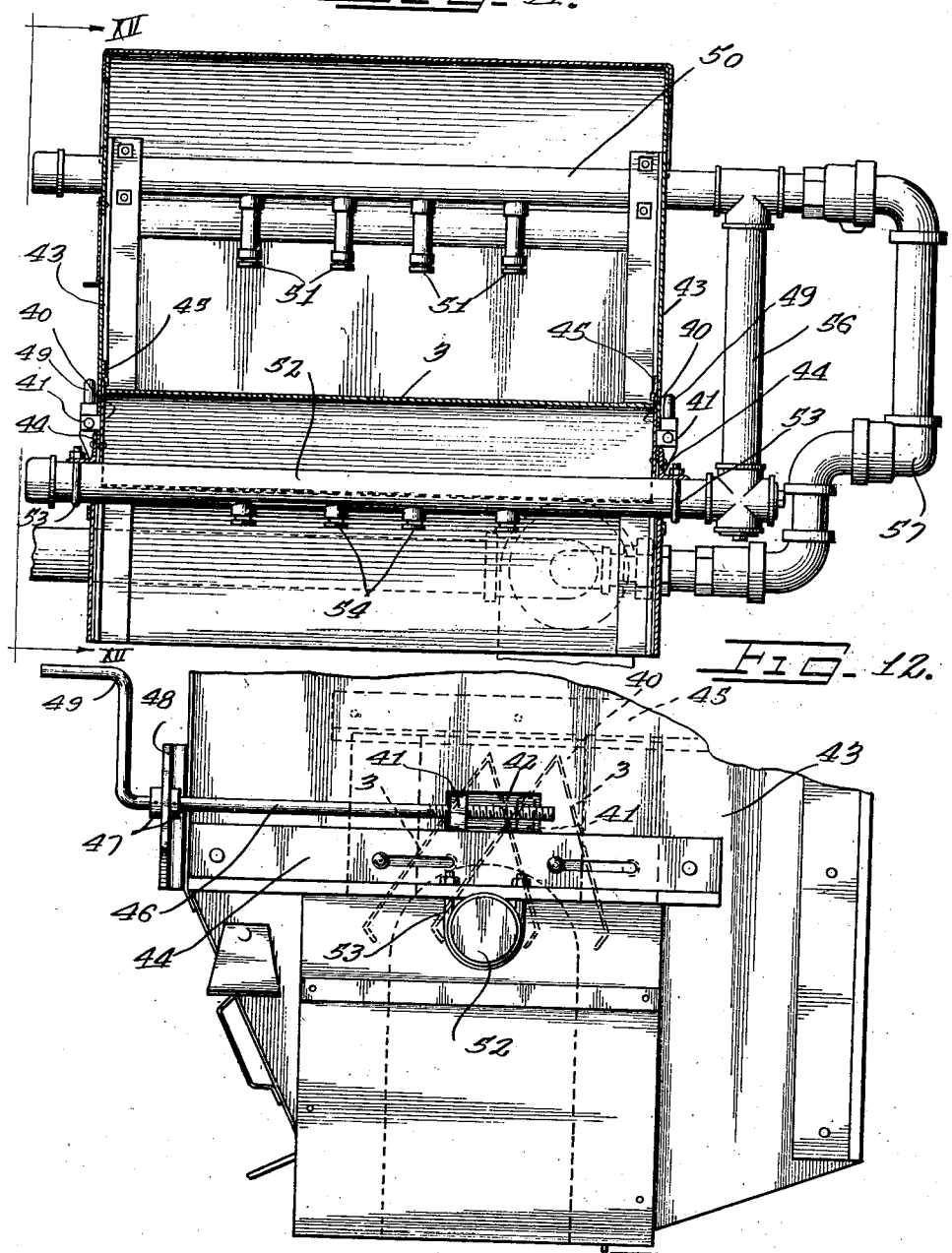

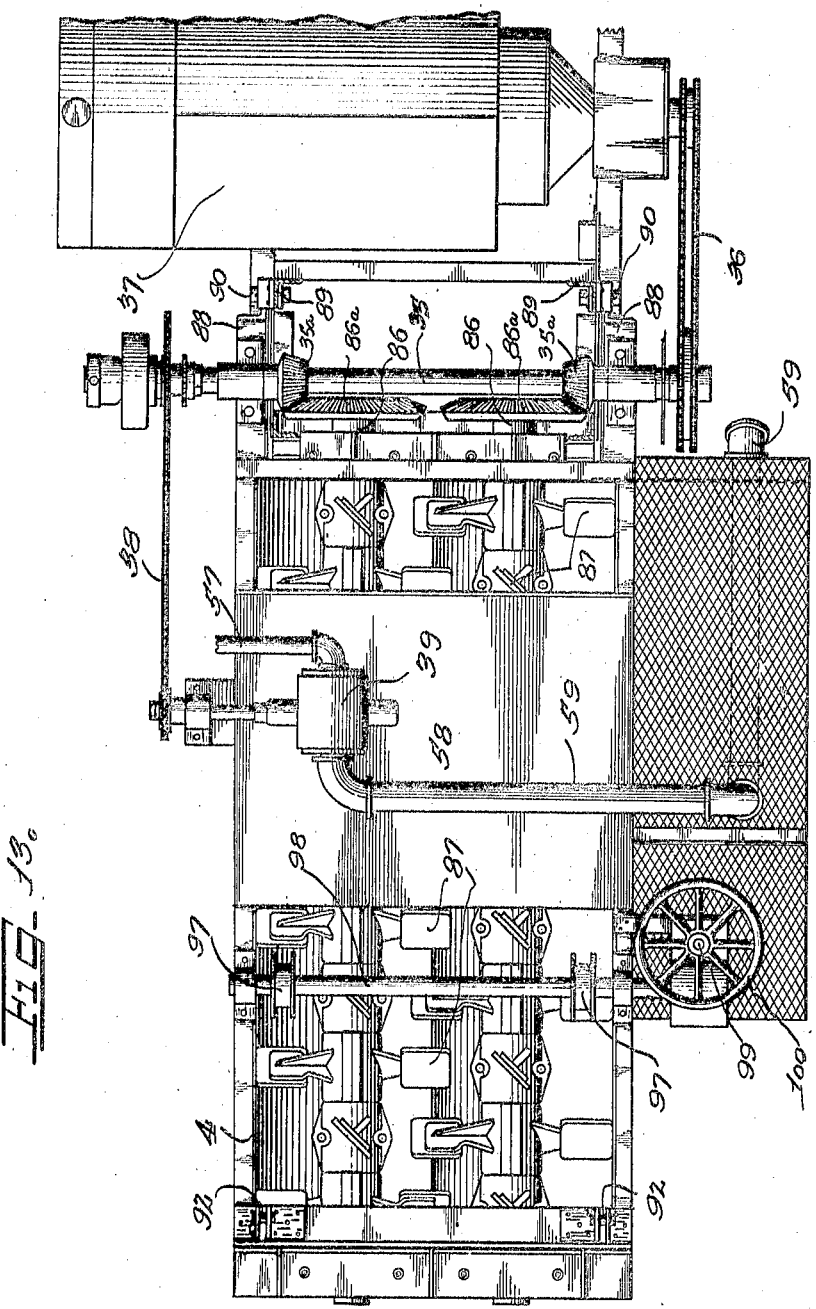

April 9, 1935.   H. H. BARBER   1,997,037
ROAD LOADER AND MIXING MACHINE
Filed Oct. 3, 1932   8 Sheets-Sheet 8
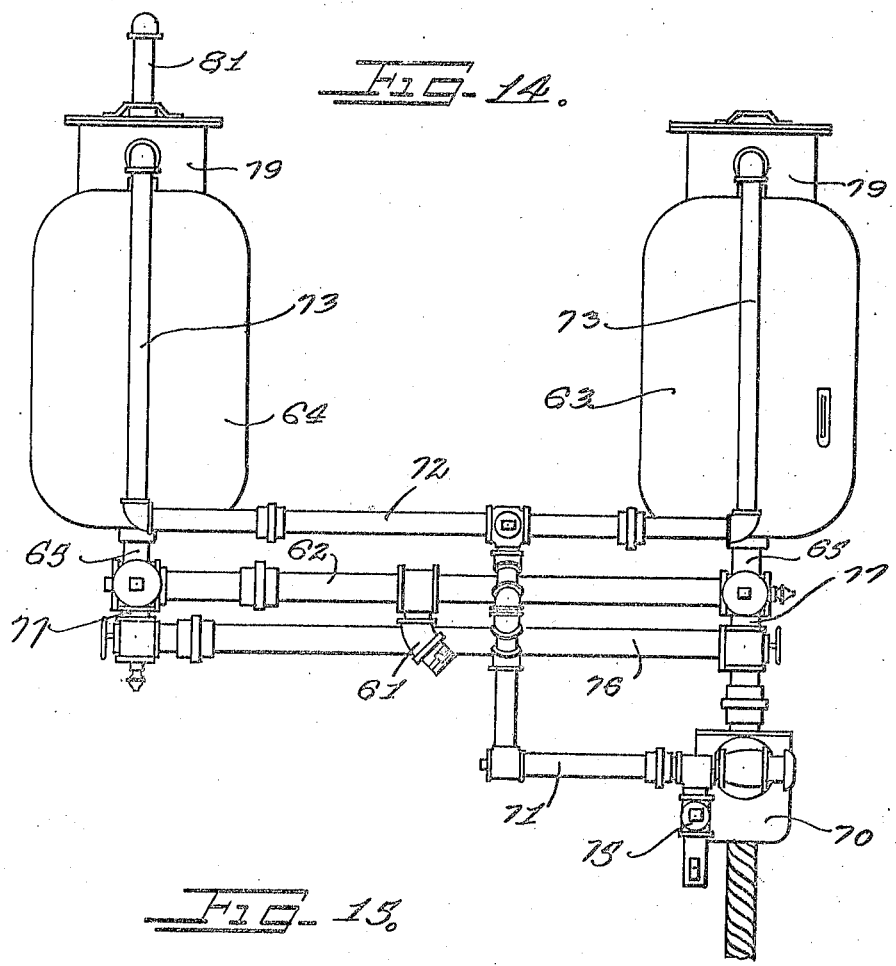
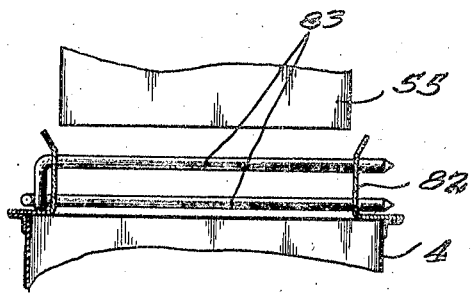
Inventor
Harry H. Barber.

Patented Apr. 9, 1935

1,997,037

UNITED STATES PATENT OFFICE 1,997,037

ROAD LOADER AND MIXING MACHINE

Harry H. Barber, Aurora, Ill., assignor to Barber-Greene Company, Aurora, Ill., a corporation of Illinois Application October 3, 1932, Serial No. 635,941

18 Claims. (Cl. 94—43)

This invention relates to a material gathering and mixing machine primarily adapted for use in paving roadways but adapted for other uses, and constitutes an improvement upon the machine disclosed in my copending application Serial No. 629,633, filed August 20, 1932.

One of the objects of the present invention consists in a mixing unit in which the mixing elements and the feed conveyor are driven from a source of power independent of that which propels the machine in order that the mixing of the aggregate which may consist of stone, gravel, slag or similar substances may be more readily controlled both as to the speed of mixing or feeding and discharging.

A further object of this invention resides in the incorporation of tanks upon the machine for supplying some binding agent for the aggregate such as bitumen or the like and controlling the flow thereof to obtain the proper proportion for spraying upon the aggregate.

One of the improved features also resides in the adjustability of the divider for the stream of aggregate so that it will be properly divided and thoroughly sprayed with the binding agent.

Another improved feature resides in means for automatically indicating the depth of aggregate in the storage hopper and in obtaining a uniform feed therefrom which may be varied without changing the propelling speed of the machine.

Oother and further novel features will be pointed out in the following description and disclosures.

The invention comprises the novel structure and combination of parts hereinafter described and more particularly pointed out and defined in the appended claims.

In the accompanying drawings which illustrate a preferred form of this invention, and in which similar reference numerals refer to similar features in the different views:

Figure 1 is a side elevational view of a road paving machine involving this invention.

Figure 2 is a rear elevational view of the machine with the finishing unit omitted.

Figure 3 is an enlarged elevational view of the connection between the mixing unit and the gathering unit with a part shown in section.

Figure 4 is an enlarged sectional view taken upon the line IV—IV of Figure 3 looking in the direction of the arrows.

Figure 5 is an enlarged sectional view taken upon the line V—V of Figure 3.

Figure 7 is an enlarged fragmentary part sectional and part elevational view of the machine, illustrating the storage hopper, the feeding mechanism therefrom and the spraying mechanism taken substantially upon the line VII—VII of Figure 2 looking in the direction of the arrows.

Figure 8 is an enlarged fragmentary vertical sectional view through the hopper.

Figure 9 is an enlarged fragmentary sectional view taken upon the line IX—IX of Figure 7.

Figure 10 is an enlarged plan view of the driving mechanism for the mixing members.

Figure 11 is an enlarged sectional view taken substantially upon the line XI—XI of Figure 7 looking in the direction of the arrows.

Figure 12 is an enlarged fragmetnary elevational view illustrating the means for adjusting the aggregate divider.

Figure 13 is an enlarged top plan view of the mixing unit.

Figure 14 is an end elevational view of the tanks and pipes for the binding agent.

Figure 15 is an enlarged sectional view taken upon the line XV—XV of Figure 7.

Figure 6:
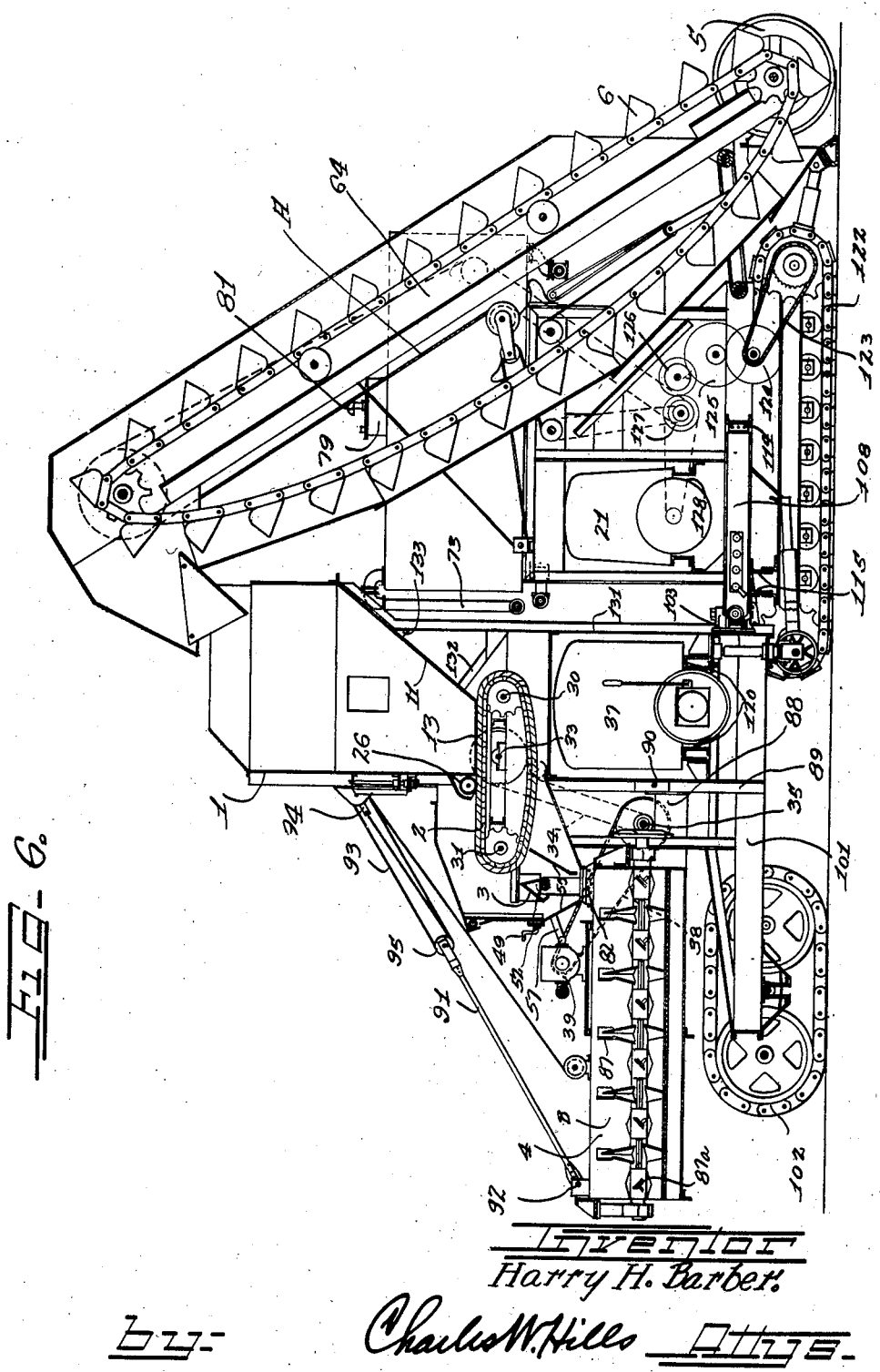
Figure 6 is an enlarged vertical sectional view taken longitudinally of the gathering and mixing units with parts shown in elevation.

In order that the invention may be fully understood, the gathering unit A and the mixing unit B have been illustrated in Figure 1 in combination with a finishing unit C which is the subject matter of an independent application. The gathering unit A picks up the aggregate from the roadway and conveys the same to a hopper I which will be described later. A feed conveyor 2 conveys the aggregate from the hopper I to a divider 3 at which point the aggregate is thoroughly sprayed with a binding agent. The sprayed stream of aggregate then descends into a mixing chamber 4 carried by a mixing unit which is coupled to the gathering unit as will later more fully appear. The aggregate travels through the mixing chamber and drops upon the roadway to be spread and tamped by the finishing unit C.

In paving roadways, it is highly essential that the aggregate and binding agent be properly proportioned and that the aggregate be uniformly discharged upon the roadway in proper quantities to obtain the required depths according to the requirements of many States and municipalities. It is also desirable that the feeding of the aggregate to the mixing chamber and the mixing of the aggregate be independent of the propelling force of the machine. The manner in which these objects are obtained in the present machine will now be set forth.

The aggregate that is usually deposited in a wind row along the roadway is gathered by the spirals 5 and elevated by the bucket line 6 and discharged into the storage hopper 1. The aggregate may accumulate in the storage hopper if there should be an excess thereof. A plurality of rods 7 journalled in suitable bearings 8 (Figure 8) attached to a wall of the hopper in vertical spaced relation are provided. With reference to Figure 8, it will be noted that these rods are provided with blades 9 upon their inner ends which are located within the hopper, and are provided with counter weights 10 upon their outer ends which extend outside of the hopper. These weights 10 normally hang downwardly and tend to hold the blades 9 in a horizontal plane. However, when the blades 9 become submerged in aggregate as shown in Figure 7, they will be forced to swing downwardly by the aggregate as it descends into a substantially vertical plane and the counter-weights will be swung to a laterally extending position as shown at the lower portion of the hopper in Figure 1 and indicate the height of the aggregate in the hopper.

The lower portion of the hopper has an inclined side 11 and an opposed vertical wall 12 and a discharge opening 13 therebetween. The front wall is provided with an adjustable slide gate 14 that may be raised or lowered by a screw rod 15 which is rotatably anchored at its upper end in a channel member 16 attached to the hopper and at its lower end in an angle member 17 which is spaced from the hopper and forms a guide member for the gate 14. The gate is provided with an angle member 18 having a nut 19 thereon which is threaded upon the rod 15. This nut 19 has a pointer 20 that cooperates with a scale 21a suitably supported adjacent the hopper. Rotation of the screw 15 will raise or lower the gate for varying the amount of material that can be discharged from the hopper. To this end the lower end of the screw is provided with a bevel gear 22 that meshes with a bevel gear 23 (Figure 2) upon a shaft 24 which is provided with a hand wheel 25.

A roller 26 which is journalled in a hood 27 secured transversely of the hopper at the discharge opening serves to provide a more uniform feed and prevent undue accumulation at the gate opening. The endless conveyor 2 is mounted beneath the hopper for supporting and conveying the aggregate. This endless feed conveyor is supported upon suitable sprocket wheels 29 which are secured upon shafts 30 and 31. The shaft 31 is connected by sprocket gearing 32 (Figure 10) with a shaft 33 which is geared by sprocket gearing 34 to a transverse shaft 35 which drives the mixer. The shaft 35 is driven by sprocket gearing 36 from a separate engine 37 which is supported upon the mixing unit. The shaft 35 is also geared by sprocket gearing 38 to a pump 39 that receives thru gravity flow the binding agent from the tanks. The pump 39 is in the nature of a proportioning valve that delivers a constant quantity of binding agent for each revolution of the pump shaft. Thus it will be apparent that the feeding of the aggregate from the hopper, the spraying thereof and the mixing thereof are carried on independently of the propelling force of the machine. As the feeding and spraying of the aggregate may be increased or decreased in volume, the thickness of the pavement laid may be uniformly varied.

The aggregate advanced by the feed conveyor 2 drops upon the inverted V-shaped divider 3, that separates or divides the aggregate into two streams as shown in Figure 7. The divider 3 is adjustable in order that it can be positioned to the center of the stream of aggregate or to one side of the center as may be desired. This adjustability is especially desirable in the event that the stream of aggregate descending from the feed conveyor should change its position for some reason.

The mechanism for adjusting the divider is best shown in Figures 11 and 12. In referring to these figures, it will be observed that a plate 40 is attached to each end of the divider 3. Each plate 40 has a lug 41 that projects through an aperture 42 in the casing 43. An angle member 44 is attached to each side of the casing 43 upon the outer surface thereof for a purpose that will later appear. Upon each inner side of the casing 43, there is a guide plate 45 having an inwardly bent margin for forming a guideway for the end plate 40 of the divider. It will be noted that each end plate 40 projects above the divider for this purpose. A screw rod 46 is threaded in each lug 41, only one of which is clearly shown in Figure 12. The screw rods 46 are rotatably anchored to the casing by a pair of collars 47 which embrace opposite sides of a flange member 48 through which the rods extend and which are secured to the casing. Each rod has a handle 49 thereon whereby it may be rotated. By adjusting these screw rods, the divider may be shifted as indicated in dotted lines in Figure 12.

As the aggregate descends from the feed conveyor 2, it is sprayed upon its outer surface by a suitable binding agent such as bitumen or the like. For this purpose, a spray pipe 50 is supported in the casing 43. This spray pipe has a plurality of nozzles 51 for spraying the width of the stream of aggregate. Below the divider 3, there is a second spray pipe 52 which is coupled to the angle members 44 by U-bolts 53. This spray pipe 52 is provided with suitable nozzles 54 for spraying the interior surface of the two streams of aggregate as shown in Figure 7. Below the divider there is a guide chute comprising the converging walls 55 that cause the two streams of aggregate to converge. It will be noted that the spray is directed upon the converging portions of the two streams.

The spray pipes 50 and 52 are in communication with each other through a connecting pipe 56. The binding agent is supplied to the pipe 50 by means of a supply pipe 57 which connects with the pump 39 that is mounted upon a platform 58 (Figure 13) over the mixing chamber. The binding agent enters the pump 39 through a pipe 59 which is connected to a flexible hose 60 (Figure 1). The flexible hose 60 is connected to a nipple 61 (Figure 14) which is connected to a transverse pipe 62 which communicates with the bottoms of the fluid tanks 63 and 64 by means of the short connecting pipes 65. Thus upon the operation of the pump 39 the binding agent which is used is drawn from the two tanks and sprayed upon the streams of aggregate. For this reason the material in the tanks is always maintained at the proper height to cause a suitable hydrostatic head to cause a uniform delivery from the pumps.

While the binding agent may be supplied to the tanks in various ways, it is preferably pumped into the tanks 63 and 64 from a tank wagon. To this end, there has been provided a suitable system of piping which consists of a hose 66 which is adapted to be connected to a tank wagon. This hose connects to a three way valve housing 67 from which a horizontal pipe 68 extends. A strainer 69 and a pump 70 is located in the horizontal pipe 68. This horizontal pipe connects with an L-shaped pipe 71 (Figure 14) which in turn connects with a transverse pipe 72 from the ends of which there extend vertical pipes 73 that discharge into the tanks 63 and 64. In some instances it is desirable to use inclined troughs 74 (Figure 1) in the tanks and connects the same with the pipes 73 and support the lower ends thereof upon the bottoms of the tanks. These troughs are desirable for certain kinds of binding agents to prevent the dropping or impingement of material on the bottom. Thus it will be apparent that by operating the pump 70, the tanks 63 and 64 may be filled with a suitable binding agent from the tank wagon. A drain pipe 75 extends from the L-shaped pipe whereby parts of the system may be drained.

Adjacent the lower forward ends of the tanks, there is a transverse pipe 76 that is connected with the bottoms of the tanks by short pipes 77, and that is connected with the three way valve housing by a short pipe 78 (Figure 1). Through proper manipulation of the different valves, it is possible to pump the fluid through the tanks, the pipe 76, the connection 78, the pipes 68, 71, 72 and 73 back to the tanks, thus maintaining a constant circulation and preventing the pipes from clogging and maintaining the fluid in agitation. This agitation may be desirable in some instances especially when the pump 39 is idle and no binding agent is being sprayed upon the aggregate. The fluid tank 63 is provided with a raised portion 79 (Figure 1) at its top from which an overflow pipe 80 (shown in dotted lines) extends. This overflow pipe is adapted to discharge upon the ground. The tank 64 has an air vent 81 (Figure 14) in a similar raised portion 79.

The sprayed aggregate passing through the chute formed by the converging walls 55 passes through a sieve 82 (Figures 7 and 15) which is in the form of a box-like structure having spaced rods 83 passing therethrough. It will be noted that the box-like structure has additional apertures 84 whereby the spacing of the rods 83 may be varied. The sieve 82 is located upon the mixing chamber 4.

The mixing chamber 4 is in the form of a trough as best shown in Figure 13. A pair of parallel shafts 86 are journalled in the end walls of the chamber and these shafts carry mixing paddles 87 which are suitably staggered. The majority of these paddles are directed at an angle of substantially 45° to gradually move the mass of material toward the rear end of the chamber. The rearmost paddles however may be directed in the opposite direction as indicated at 87ª in Figure 6 to exercise a retarding effect. As the shafts 86 revolve the mass of material is thoroughly agitated and gradually moved rearwardly and discharged from the mixing chamber. The shafts 86 are adapted to be simultaneously rotated by the bevel gears 86ª thereon and bevel gears 35ª on the aforementioned shaft 35 which is journalled in bearings upon the mixing chamber. It might be mentioned that the discharged material falls upon the ground or into a hopper on the finishing unit, to be acted upon by the finishing unit C.

The mixing chamber is supported for upward and downward tilting movement to regulate the discharge therefrom especially when the machine is upon an incline. To this end, the frame or forward portion of the mixing chamber has a pair of forwardly extending members 88 (Figures 6 and 13) which are pivoted to uprights 89 on the mixing unit as indicated at 90. A pair of rods 91 only one of which is shown are attached to the rear end of the mixing chamber by pivots 92. Suitable cables 93 are attached to the walls of the hopper as indicated at 94. The cables are trained over pulleys 95 on the rods 91 and over pulleys 96 (Figure 2) mounted upon the hopper. The free ends of the cables are attached to winding drums 97 secured upon a winding shaft 98 (Figure 13) journalled upon the top of the mixing chamber. The winding shaft 98 is geared to a vertical shaft 99 having a hand wheel 100 thereon. The gearing connecting these shafts is not shown since the same is old and well known. By rotating the hand wheel 100, the rear end of the mixing chamber may be raised or lowered to vary the discharge therefrom.

The mixing unit embodies a frame 101 (Figure 6) which supports the aforementioned uprights 89, and to which suitable crawlers 102 may be attached. The frame 101 is adapted to be coupled to or uncoupled from the frame of the gathering unit. This feature makes it possible to use the gathering unit independent of the mixing unit. To this end the forward end of the frame is provided with a central coupling member 103, the details of which are shown in Figures 3 and 4. This coupling member has spaced upper and lower apertured bearings 104 between which there is located an apertured swivel block 105 having end trunnions 106. A pivot bolt 107 extends through the aperture in the swivel block and through the apertures in the bearings 104.

The swivel block 105 is extensibly connected to the frame of the gathering and elevating unit to regulate the trailing relation of the mixing unit as shown in Figures 3 to 6. The extensible connection consists of a pair of spaced channel members 108 which are connected by a plate 109. These channel members are so spaced as to fit the swivel block and the rear ends are apertured and are swiveled upon the trunnions 106. Suitable nuts 110 and 111 are fastened upon the trunnions over the channel members. A pair of spaced channel members 112 connected by a plate 113 are located between the channel members 108 and form the support therefor. The rear ends of the channel members 112 are spaced from the swivel block as shown in Figures 3 and 4. The forward ends of the inner channel members 112 are secured to a frame member 114 of the mixing unit. In referring to Figure 6 it will be noted that channel members 112 are attached at their rear portions to frame members 115 of the gathering unit. The channel members 108 have their webs reinforced by plates 116 and the channels 112 have their webs reinforced by plates 117. The plates 116 and the webs of the channels 108 are provided with a series of registering apertures 118. The rear ends of the channels 112 and their reinforcing plates are apertured to receive a bolt 119 having a handle 120. The bolt 119 is adapted to be removed whereupon the channel members 108 may be slid relative to the stationary channel members 112 until a different set of apertures 118 become aligned with the bolt holes in the inner channel members 112, when the bolt may be inserted. Thus it will be seen that a pair of telescopic coupling members have been provided whereby the trailing relation of the mixing unit with respect to the gathering unit may be varied.

The frame of the mixing unit B is provided with a platform 120 (Figure 6) for supporting the engine 37 which operates the feed conveyor 2, the pump 39 and the mixing shafts independently of the gather unit. This frame of the mixing unit supports the hopper 1. To this end, suitable uprights 131 (Figs. 6 and 7) extend from the frame 101. The upper portion of the upright 131 is inclined and supports the inclined bottom of the hopper. Suitable brackets 132 and 133 extend from the uprights 131 to the hopper. A pair of channel members 134 (Figs. 1 and 2) or the like are attached to the rear wall of the hopper. The lower ends of the channels 134 are attached to plates 135 (Fig. 1) which are pivoted to the frame as indicated at 136 so that the hopper can be swung rearwardly upon the pivots 136. Only one plate 136 is clearly shown but it will be understood that the same is duplicated upon the other side of the machine.

The gathering unit is provided with an engine 21 preferably an internal combustion engine having a variable speed control for operating the bucket line and propelling such unit. The gathering unit is mounted upon suitable crawlers 122 which are driven by gearing 123 to 128 from the motor. Thus it will be apparent that the propelling force of the machine is independent of the force that controls the proportioning of the road building material and the mixing thereof.

In the event that an undue accumulation of aggregate takes place in the hopper, part may be allowed to escape through a laterally directed chute 129 (Figure 2) having a gate, not shown, controlled by a cable 130.

While the operation of the machine is simple and apparent from the foregoing, it may be desirable to point out how the proper proportioning of the material is obtained and maintained constant irrespective of the speed of the gathering unit and the amount of material that is being elevated by the bucket line. This can be best understood from examining Fig. 10. First, the engine 37 is started at the desired speed, and the gate upon the hopper will be regulated so that the desired amount of aggregate will be advanced to the mixer. Now the binding agent that is sprayed upon the aggregate is controlled by the pump 39 driven from the engine 37. To obtain the proper amount of the binding agent, the gearing 38 may be modified by changing the sprocket upon the pump. When the parts have once been set to obtain the proper proportions of aggregate and binding agent, a constant mixture will be obtained. This is due to the fact that the feeding of these parts is controlled by the same engine which is independent of the propelling force of the machine. Of course, it is possible to increase or decrease the aggregate fed from the hopper by adjusting the gate.

It will be appreciated that the gathering unit may be caused to travel faster or slower according to the amount of material on the roadway. While the operation of the mixer will not be affected due to the fact that it is driven from a different engine, consequently the speed of the gathering unit may determine the amount of material discharged and the thickness of the pavement laid.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In a road building machine, a unit for gathering and elevating aggregate, a hopper for receiving said aggregate, an aggregate feeding conveyor beneath said hopper, a tank upon said unit for carrying a binding agent, means including an engine for propelling said unit, a mixing unit in trailing relation to said gathering unit, and supporting said hopper, a mixing chamber carried by said mixing unit, mixing elements in said chamber, an engine carried by said mixing unit, means for operating said mixing elements from said last-mentioned engine, means for operating said aggregate conveyor from said last-mentioned engine, a pipe extending from said tank for spraying said aggregate with a binding material including a pump in said pipe line and means for operating said pump from said last-mentioned engine.

2. In a road building machine, an aggregate elevating unit, a hopper for receiving the aggregate, a tank upon said unit for containing a binding agent, means for propelling said unit, a second unit rearwardly of the first unit, and supporting said hopper, a mixer carried by said second unit, and means controlled by said second unit for feeding the aggregate and binding agent in proper quantities, mixing the same and maintaining a constant proportion of parts.

3. In a road building machine, aggregate gathering and elevating mechanism, a hopper upon said machine for receiving said aggregate, an aggregate feeding conveyor beneath said hopper, a mixer on said machine for receiving said aggregate, means for spraying said aggregate with a binding material including a pump, means for propelling said machine and an independent source of power for operating the aggregate conveyor, said pump and said mixer for the purpose set forth.

4. In a road building machine, aggregate elevating mechanism, a hopper upon said machine for receiving said aggregate, a conveyor beneath said hopper for feeding said aggregate, mechanism for spraying said aggregate with a binding agent, a mixer on said machine for mixing said sprayed aggregate, and a source of power independent of the propelling force of said machine for operating said feed conveyor, said binding agent feeding mechanism and said mixer.

5. In a road building machine, means for propelling said machine, means for supplying a constant quantity of aggregate, means for spraying said aggregate with a constant proportion of binding material, and an engine independent of the propelling means of said machine for operating said aggregate supplying means, and said spraying means.

6. In a road building machine, aggregate gathering and elevating mechanism, a hopper upon said machine for receiving the aggregate, an endless conveyor beneath said hopper for discharging the aggregate in a stream, a device for separating said stream of aggregate into parts and means for adjusting said device.

7. In a road making machine, an aggregate gathering and elevating unit, a hopper for receiving said aggregate, means for controlling the flow of said aggregate from said hopper for causing said aggregate to advance in a stream, and adjustable means for splitting said stream of aggregate into a plurality of parts.

8. In a road building machine, means for conveying aggregate, a tank for containing a binding agent, a system of piping including a pump for spraying the aggregate, and means for maintaining a circulation of the binding agent through said tank for the purpose set forth.

9. In a road building machine, an aggregate gathering and elevating unit, a tank for containing a binding agent located upon said unit, a system of pipes including a pump therein connected with said tank for spraying aggregate, and means for shutting off the spraying portion of said piping and maintaining a circulation through said tank.

10. In a road building machine, aggregate gathering and elevating mechanism, a hopper upon said machine for receiving aggregate, a tank on said unit for containing a binding agent, a pipe connecting with said tank for filling the same with a binding agent, a pipe extending from the bottom of said tank, a pump connected to said last-mentioned pipe for spraying said binding agent upon the aggregate, and means for shutting off the spraying portion of the last mentioned pipe and maintaining a circulation of the binding agent through said tank.

11. In a road paving machine adapted for travelling over the road bed, a hopper for receiving aggregate and having a discharge orifice in the bottom, an endless conveyor beneath said orifice for conveying the aggregate and discharging the same in a stream, an adjustable gate on the front wall of the hopper for controlling the amount of aggregate carried by said conveyor, means for spraying said stream of aggregate with a binding agent, a mixer for receiving the sprayed aggregate and a source of power independent of the propelling power of the machine for operating said conveyor, spraying means and mixer.

12. In a road paving machine, means for feeding aggregate in a stream, means for spraying said stream with a binding agent, comprising a tank, piping extending from said tank, a pump connected on said piping, means for operating said pump for spraying the binding agent upon said stream, a supply pipe extending to said tank, a circulating pipe connected to said tank and supply pipe, and means for causing a circulation through said tank, supply pipe and circulating pipe when said pump is idle.

13. In a road building machine, means including an endless conveyor for feeding aggregate in a stream, means including a pump for spraying a binding agent upon said stream of aggregate, and means including an engine for simultaneously operating said conveyor and pump whereby the rate of feed of said aggregate and the rate of feed of said binding agent are maintained at the same ratio.

14. In a road paving machine, means for feeding aggregate in a stream, means for spraying the stream of aggregate with a binding agent, comprising a circulating system including a pump and an auxiliary pipe for producing a second circulating system when the pump is idle, and means for causing the binding agent to circulate through said second circulating system.

15. In a road paving machine, a hopper for receiving aggregate, an endless conveyor, means for supporting said conveyor beneath said hopper, said hopper having an open bottom whereby said conveyor forms the bottom of the hopper, means associated with the hopper for determining the amount of aggregate that the conveyor carries from said hopper, said conveyor discharging said aggregate in a stream, means including a pump for spraying said stream of aggregate with a binding agent, and a single source of power for operating said conveyor and pump for maintaining a proper proportion of aggregate and binding substance.

16. In a road paving machine, the combination with a propelled vehicle of a conveyor for feeding aggregate in a stream, means including a pump for spraying said stream of aggregate with a binding agent, and a single source of power for simultaneously operating said conveyor and pump for simultaneously controlling the rate of feed thereof.

17. In a road paving machine adapted to travel over the roadway, means for supplying aggregate to said machine, means including a conveyor for feeding said aggregate in a stream, means including a pump for spraying said stream with a binding agent, and a power element having an operative connection with said conveyor and pump for simultaneously operating the same for maintaining a constant proportion of parts of said aggregate and binding agent.

18. In a road building machine, an aggregate gathering and elevating unit, an engine carried by said unit for propelling the same, an aggregate mixing unit in trailing relation to said gathering unit, a hopper upon said mixing unit for receiving the elevated aggregate, a mixing device carried by said mixing unit, a feeding device for feeding the aggregate from said hopper to said mixing device, a spraying device for spraying the aggregate as it passes from said hopper to said mixer, an engine carried by said mixing unit, and an operative connection between said last mentioned engine and each of said devices for simultaneously operating the same for the purpose set forth.

HARRY H. BARBER.